United States Patent [19]

Pruett et al.

[11] Patent Number: 4,617,374

[45] Date of Patent: Oct. 14, 1986

[54] UV-ABSORBING CONDENSATION POLYMERIC COMPOSITIONS AND PRODUCTS THEREFROM

[75] Inventors: Wayne P. Pruett; Richard H. S. Wang, both of Kingsport; Samuel D. Hilbert, Jonesborough; Max A. Weaver, Kingsport, all of Tenn.

[73] Assignee: Eastman Kodak Company, Rochester, N.Y.

[21] Appl. No.: 823,425

[22] Filed: Jan. 28, 1986

Related U.S. Application Data

[63] Continuation-in-part of Ser. No. 702,106, Feb. 15, 1985.

[51] Int. Cl.⁴ .................. C08G 63/44; C08G 69/44; C08G 73/16
[52] U.S. Cl. .................. 528/288; 528/289; 528/290; 528/291; 528/292; 528/345
[58] Field of Search ............ 528/288, 289, 290, 291, 528/292, 345

[56] References Cited

U.S. PATENT DOCUMENTS

| | | | |
|---|---|---|---|
| 4,297,502 | 10/1981 | Herrmann et al. | 528/288 |
| 4,359,507 | 11/1982 | Davis et al. | 528/289 |
| 4,377,669 | 3/1983 | Zweifel et al. | 525/445 |
| 4,400,500 | 8/1983 | Kelley et al. | 525/345 |

OTHER PUBLICATIONS

Hackh's Chemical Dictionary (4th Ed.), McGraw-Hill, Inc., (1969), p. 424.

*Primary Examiner*—Lucille M. Phynes
*Attorney, Agent, or Firm*—Donald W. Spurrell; J. Frederick Thomsen

[57] ABSTRACT

Polyester compositions useful in formed articles such as beverage bottles and having condensation reacted therein at least one UV-absorbing compound of the formula

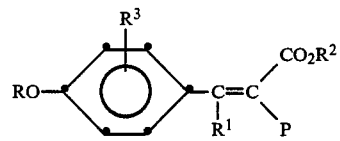

wherein:
R is hydrogen, alkyl, substituted alkyl, aryl, substituted aryl, cycloalkyl, substituted cycloalkyl, or alkenyl;
$R^1$ is hydrogen, or alkyl, aryl, or cycloalkyl, all of which may be substituted;
$R^2$ is hydrogen, or alkyl, cycloalkyl or aryl, all of which may be substituted;
$R^3$ is hydrogen or 1-3 substituents; and
P is cyano or a group such as carbamoyl, aryl, alkylsulfonyl, arylsulfonyl, alkanoyl or aroyl, all of which groups may be substituted;
whereby the polyester composition has maximum light radiation absorbance within the range of from about 320 nm to about 380 nm.

10 Claims, No Drawings

UV-ABSORBING CONDENSATION POLYMERIC COMPOSITIONS AND PRODUCTS THEREFROM

This application is a continuation-in-part of Ser. No. 702,106, filed Feb. 15, 1985.

This invention concerns condensation polymers including polyester and polycarbonate types, wherein certain UV (ultraviolet light) absorbing methine compounds have been reacted into the polymer as a chain terminator to impart UV screening properties thereto. Many products such as fruit juices, soft drinks, wines, food products, cosmetics and shampoos are deleteriously affected by UV light when packaged in clear plastic containers which pass significant portions of the available light at any wavelength from approximately 250 to 390 nm. By use of the present compounds polymeric containers can be manufactured which absorb these harmful wavelengths and therefore reduce or eliminate the UV light degradation of products packaged therein.

A further advantage of the present polymeric compositions is that conventional polyester dyes and other additives such as pigments, fillers, brighteners and the like may be incorporated therein, and the UV screening properties of the methine compounds impart significant stabilization to both the polyester and the dyes.

The present compounds are thermally stable and nonsublimable at the polymer preparation and processing temperatures, are fast to light and are nonextractable from the polymers, thus rendering the polymers particularly suitable for use as beverage bottles and food, pharmaceutical cosmetic containers. The methine compounds are useful in total concentrations given herein in parts per million (ppm) ranging from about 1.0 to about 5,000, preferably 2.0 to about 1,500 (parts by weight of methine compound per million parts by weight of condensation polymer).

The present polymers are linear, thermoplastic, molding or fiber grade having an I.V. of from about 0.4 to about 1.2, and preferably are polyesters wherein the acid moiety is comprised of at least about 50 mol % terephthalic acid residue, and the glycol moiety of at least about 50 mol % ethylene glycol or 1,4-cyclohexanedimethanol residue, and containing a total of from about 2 to 1,500 ppm of one or more of the reacted methine compounds.

In accordance with the present invention, certain UV-absorbing methine compounds defined below are reacted with the condensation polymer and impart thereto the property of ultraviolet or visible light absorption generally with a maximum absorbance within the range of from about 320 nm to about 380 nm. These compounds preferably have molecular weights of from about 200 to about 600 although lower and higher molecular weight compounds are also operable. These compounds contain an acid or ester group which condenses onto the polymer chain as a terminator. As aforesaid, these compounds are thermally stable at polymer processing conditions, which includes polycondensation temperatures of up to about 300° C. which are employed, for example, in the preparation of polyesters such as poly(ethylene terephthalate) and copolymers of poly(ethylene terephthalate) and poly(1,4-cyclohexylenedimethylene terephthalate).

The present invention is defined in its broad embodiment as a composition comprising molding or fiber grade condensation polymer having reacted therewith a total of from 1.0 to about 5,000 ppm, of at least one compound of the formula

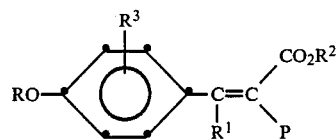

absorbing in the range of from about 320 nm to about 380 nm, and being nonextractable from said polymer and stable under the polymer preparation and processing conditions wherein in the above formula:

R is hydrogen, alkyl, substituted alkyl, aryl, substituted aryl, cycloalkyl, substituted cycloalkyl or alkenyl;

$R^1$ is hydrogen, or a group such as alkyl, aryl, or cycloalkyl, all of which groups may be substituted;

$R^2$ is any radical which does not interfere with condensation with the polyester, such as hydrogen, alkyl, substituted alkyl, allyl, cycloalkyl or aryl;

$R^3$ is hydrogen or 1-3 substituents selected from alkyl, substituted alkyl, alkoxy, substituted alkoxy and halogen; and P is cyano, or a group such as carbamyl, aryl, alkylsulfonyl, arylsulfonyl, heterocyclic, alkanoyl, or aroyl, all of which groups may be substituted.

Preferred methine compounds are those of the above formula wherein:

$R^2$ is hydrogen, alkyl, aralkyl, cycloalkyl, cyanoalkyl, alkoxyalkyl, hydroxyalkyl or aryl;

R is selected from hydrogen; cycloalkyl; cycloalkyl substituted with one or two of alkyl, alkoxy or halogen; phenyl; phenyl substituted with 1-3 of alkyl, alkoxy, halogen, alkanoylamino, or cyano; straight or branched lower alkenyl; straight or branched alkyl and such alkyl substituted with 1-3 of the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamoyl; vinylsulfonyl; acrylamido; sulfamyl; benzoylsulfonicimido; alkylsulfonamido; phenylsulfonamido; alkenylcarbonylamino; groups of the formula

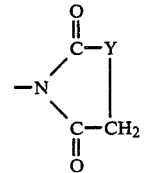

wherein Y is —NH—,

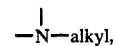

—O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl, or a radical of the formulae

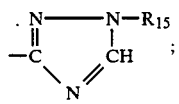

—NHXR$_{16}$; —CONR$_{15}$R$_{15}$; and —SO$_2$NR$_{15}$R$_{15}$; wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—; R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 of alkyl, alkoxy, or halogen; and P is cyano, carbamyl, N-alkylcarbamyl, N-alkyl-N-arylcarbamyl, N,N-dialkylcarbamyl, N,N-alkylarylcarbamyl, N-arylcarbamyl, N-cyclohexylcarbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl or acyl.

In all of the above definitions the alkyl or divalent aliphatic moieties or portions of the various groups contain from 1-10 carbons, preferably 1-6 carbons, straight or branched chain.

A most preferred polyester composition contains the reaction residue of the compound

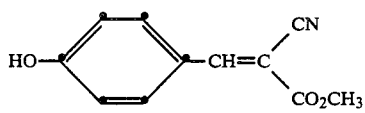

in from about 10 to about 300 ppm.

The nonextractabilities of the present methine compounds are determined as follows:

Extraction Procedure

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 ml. solvent/100 in.$^2$ surface area (2 ml/in.$^2$).

Solvent blanks are run under the same extraction conditions without polymer. In most cases samples are extracted, spiked, and analyzed in duplicates.

Extraction Conditions

1. Water. The samples at room temperature are added to solvent and heated at 250° F. for two hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours and 30 days.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

4. Any suitable analytical technique and apparatus may be employed to determine the amount of methine compound extracted from the polymer. The extractability of the present compounds are found to be essentially nonexistent.

The types of polyesters useful in this invention for reaction with the methine compounds are those produced by conventional techniques using one or more diols and one or more dicarboxylic acids. Typical of these polyesters are those disclosed, for example, in U.S. Pat. No. 4,359,570 incorporated herein by reference.

The diol components of the polyester are selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo-[5.2.1.0]-decane wherein X represents 3, 4, or 5, and diols containing one or more oxygen atoms in the chain, e.g., diethylene glycol, triethylene glycol, dipropylene glycol, tripropylene glycol and the like containing from about 2 to about 18, preferably 2 to 12 carbon atoms in each aliphatic moiety. Cycloaliphatic diols can be employed in their cis or trans configuration or as mixtures of both forms.

The acid components (aliphatic, alicyclic, or aromatic dicarboxylic acids) of the polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and the like. In the polymer preparation, it is often preferable to use a functional acid derivative thereof such as the dimethyl, diethyl, or dipropyl ester of the dicarboxylic acid. The anhydrides of these acids also can be employed.

The preferred copolyesters are especially useful for making blow molded bottles or containers for beverages, and for molded food packages and the like. In this regard, certain of these copolyesters are color, I.V., and heat distortion or "hot fill" stable at temperatures of up to about 100° C. when properly heat set, and molded articles therefrom exhibit good thin wall rigidity, excellent clarity and good barrier properties with respect to water and atmospheric gases, particularly carbon dioxide and oxygen.

In regard to products having the "hot fill" stability, the most preferred polyesters therefor comprise poly(ethylene terephthalate) and this polymer modified with up to about 5 mole % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, these most preferred polyesters have an I.V. of 0.65 to 0.85, and a Tg of >70° C., and film sections cut from the bottle have a Water Vapor Transmission Rate of 1.5 to 2.5 g. mils/100 in.$^2$-24 hrs., a CO$_2$ Permeability of 20-30 cc. mils/100 in.$^2$-24 hrs.-atm., and an O$_2$ Permeability of 4-8 cc. mils/100 in.$^2$-24 hrs.-atm. The Tg is determined by Differential Scanning Calorimetry at a scan rate of 20 Centigrade Degrees/min., the O₂ Permeability by the standard operating procedure of a MOCON OXTRAN 100 instrument of Modern Controls, Inc., of Elk River, Minn., and the CO₂ Permeability by the standard operating procedure of a MOCON PERMATRAN C II, also of Modern Controls.

The following examples will illustrate syntheses of the methine compounds.

EXAMPLE A

Ethyl 2-cyano-3-(4-hydroxyphenyl)propenoate shown below is prepared by the reaction of 4-hydroxybenzaldehyde with ethyl cyanoacetate in the presence of a base catalyst in toluene. This pale yellow compound absorbs UV light at $\lambda_{max}$ 350 nm with a molar extinction coefficient of 27,000.

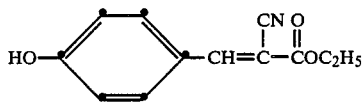

EXAMPLE B

Methyl 2-Cyano-3(4-hydroxyphenyl)propenoate is prepared as follows:

p-Hydroxybenzaldehyde (6.1 g., 0.05 m), methyl cyanoacetate (5.5 g, 0.055 m), methanol (40 ml), and piperidine (5 drops) are mixed and heated at reflux for 1 hour. After allowing to cool, the reaction mixture is acidified (to Congo Red paper) by addition of 10% HCl. The product is collected by filtration, washed with methanol and dried in air. This purified product absorbs UV light strongly at 345 nm in acetone, has a molar extinction coefficient of 28,459, and has the following structure:

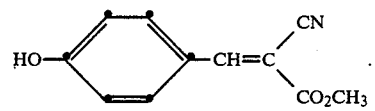

Other exemplary methine compounds useful herein as condensable reactants are given in the following table.

TABLE 1

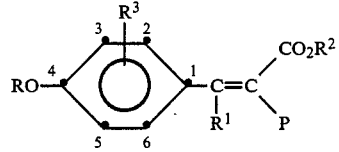

| Example No. | R | R¹ | R² | R³ | P |
|---|---|---|---|---|---|
| 1 | H | H | CH₃ | Br | CN |
| 2 | H | CH₃ | C₂H₅ | H | CN |
| 3 | H | C₆H₅ | CH₃ | H | COC₆H₅ |
| 4 | H | C₆H₁₁ | CH₃ | H | CN |
| 5 | CH₃ | H | CH₃ | H | CN |
| 6 | H | H | CH₃ | 3-OCH₃ | CN |
| 7 | CH₃ | H | CH₂C₆H₅ | 3-OCH₃ | CN |
| 8 | H | H | C₆H₁₁ | 3-CH₃ | CN |
| 9 | H | H | C₆H₅ | 3-Cl | CN |
| 10 | C₆H₁₁ | H | CH₂CH₂OH | H | CN |
| 11 | C₆H₅ | H | CH₂CH₂CN | H | CN |
| 12 | p-CH₃C₆H₁₀ | H | CH₂CH₂OCH₃ | H | CN |
| 13 | C₄H₉—n | H | H | H | CN |
| 14 | CH₂OC₆H₅ | H | CH₃ | H | CN |
| 15 | CH₂CH=CH₂ | H | CH₃ | H | CN |
| 16 | O—ClC₆H₄ | H | CH₃ | H | CN |
| 17 | p-CH₃OC₆H₄ | H | CH₃ | H | CN |
| 18 | p-CH₃CONHC₆H₄ | H | CH₃ | H | CN |
| 19 | CH₂C₆H₁₁ | H | CH₃ | 3-OCH₃ | CONH₃ |
| 20 | CH₂CH₂Cl | H | CH₃ | 3-OCH₃ | CONHC₆H₅ |
| 21 | CH₂CH₂CN | H | CH₃ | 3-OCH₃ | CONHC₂H₅ |
| 22 | CH₂CH₂—N(COCH₂)(COCH₂) | H | CH₃ | 3-OCH₃ | CON(C₂H₅)₂ |
| 23 | CH₂CH₂—N(COCH₂)(CH₂CH₂) | H | CH₃ | H | (isoindolinone structure) |
| 24 | CH₂CH₂C₆H₄p-CH₃ | H | CH₃ | H | (oxadiazole structure) |

TABLE 1-continued

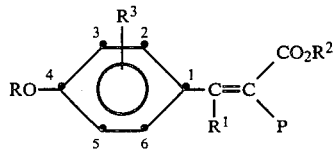

| Example No. | R | R¹ | R² | R³ | P |
|---|---|---|---|---|---|
| 25 | $CH_2CH_2SC_4H_9$—n | H | $CH_3$ | H | (benzimidazol-2-yl) |
| 26 | $CH_2CH_2SC_6H_4$—p-$CH_3$ | H | $CH_3$ | 3-$OCH_3$ | $SO_2CH_3$ |
| 27 | $CH_2CH_2SC_6H_4$—m-Cl | H | $CH_3$ | 3-$OCH_3$ | $SO_2C_6H_5$ |
| 28 | $CH_2CH_2S$—(1,2,4-triazol-3-yl) | H | $CH_3$ | 3-$OCH_3$ | $COCH_3$ |
| 29 | $CH_2CH_2CH_2SO_2CH_3$ | H | $CH_3$ | 3-$OCH_3$ | $C_6H_5$ |
| 30 | $CH_2CH_2S$—(benzothiazol-2-yl) | H | $CH_3$ | 3-$OCH_3$ | $CONHC_6H_5$ |
| 31 | $CH_2CH_2S$—(1-ethyl-1,2,4-triazol-3-yl) | H | $CH_3$ | H | CN |
| 32 | $CH_2CH_2S$—(benzoxazol-2-yl) | H | $CH_3$ | H | CN |
| 33 | $CH_2CH_2SO_2CH_2CH_2SCH_3$ | H | $CH_3$ | H | CN |
| 34 | $CH_2CH_2SO_2CH_2CH_2SC_6H_5$ | H | $CH_3$ | H | CN |
| 35 | $CH_2CH_2NHCOCH_3$ | H | $CH_3$ | H | CN |
| 36 | $CH_2CH_2NHCOCH_2C_6H_5$ | H | $CH_3$ | H | CN |
| 37 | $CH_2CH_2CH_2CH_2OC_6H_5$ | H | $CH_3$ | H | CN |
| 38 | $CH_2CH_2CH_2NHCOC_6H_{11}$ | H | $CH_3$ | H | CN |
| 39 | $(CH_2)_6NHCOCH_2OCH_3$ | H | $CH_3$ | H | CN |
| 40 | $(CH_2)_5NHCONHC_2H_5$ | H | $CH_3$ | H | CN |
| 41 | $(CH_2)_4NHCONHC_6H_5$ | H | $CH_3$ | H | CN |
| 42 | $CH_2CH_2NHSO_2C_6H_5$ | H | $CH_3$ | H | CN |
| 43 | $CH_2CH_2N(CH_3)SO_2CH_3$ | H | $CH_3$ | H | CN |
| 44 | $CH_2CH_2SO_2N(CH_3)_2$ | H | $CH_3$ | H | CN |
| 45 | $CH_2CH_2SO_2CH=CH_2$ | H | $CH_3$ | H | (5-methyl-1,3,4-thiadiazol-2-yl) |

TABLE 1-continued

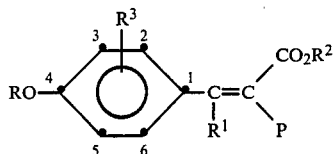

| Example No. | R | R¹ | R² | R³ | P |
|---|---|---|---|---|---|
| 46 | (CH₂CH₂–N ring with C–NH, C–CH₂, two C=O) | H | CH₃ | H | CON(CH₃)C₆H₅ |
| 47 | (CH₂CH₂N saccharin-like ring with C=O, SO₂, benzo) | H | CH₃ | H | CN |
| 48 | (CH₂CH₂N ring with C–S, C–CH₂, two C=O) | H | CH₃ | H | CN |
| 49 | (CH₂CH₂N ring with C–CH₂, O, C–CH₂, two C=O) | H | CH₃ | H | CN |
| 50 | CH₂CH₂CH₂NHCOC₂H₅ | H | CH₃ | H | CN |
| 51 | H | H | CH₃ | 3,5-di-OCH₃ | CN |
| 52 | CH₃ | H | CH₃ | 3,5-di-OCH₃ | CN |

Typical polyesters prepared in accordance with this invention are given in the examples below.

The inherent viscosities (I.V.) of each of the copolyesters herein are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)_{0.50\%}^{25°\,C.} = \frac{\ln \frac{t_s}{t_o}}{C}$$

where:
($\eta$)=Inherent viscosity at 25° C. at a polymer concentration of 0.5 g./100 ml. of solvent;
ln=Natural logarithm;
$t_s$=Sample flow time;
$t_o$=Solvent-blank flow time; and
C=Concentration of polymer in grams per 100 ml. of solvent=0.50.

EXAMPLE 53

A typical synthesis of poly(ethylene terephthalate) reacted with a methine compound is as follows. A total of 97 g (0.5 mol) dimethyl terephthalate, 62 g (1.0 mol) ethylene glycol, 0.0192 g (200 ppm) of the compound

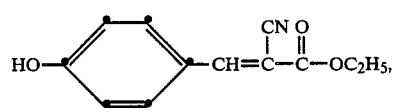

and 0.29 ml of a n-butanol solution of acetyl triisopropyl titanate which contains 0.03 g titanium per ml are weighed into a 500-ml, single-necked, round-bottom flask equipped with a nitrogen inlet, stirrer, vacuum outlet, and condensing flask. The flask and contents are heated at 200° C. in a Belmont metal bath for 60 minutes, at 210° C. for 75 minutes, and at 230° C. for 50 minutes with a nitrogen sweep over the reaction mixture while the ester interchange reaction takes place. The metal bath temperature is increased to 270° C. and vacuum, with a stream of nitrogen bleeding into the system, is applied slowly over a 10-minute period until reduced to 100 mm Hg. The flask and contents are then heated at 270° C. under this vacuum for 30 minutes, the metal bath temperature increased to 285° C., and the vacuum reduced slowly over a 10-minute period to 4 to 5 mm Hg. The flask and contents are heated at 285° C. under this vacuum for 25 minutes, the vacuum then reduced to 0.3 to 0.5 mm Hg and polycondensation continued at 285° C. for 16 minutes. The flask is removed from the metal bath and allowed to cool in nitrogen atmosphere while the polyester crystallizes. The resulting polymer is brilliant yellow and has an inherent viscosity of 0.58 measured as above. A UV visible spectrum on amorphous film of the polymer shows a strong absorption peak at about 350 nm.

EXAMPLE 54

A typical synthesis of poly(ethylene terephthalate) copolymerized with 31 mol % 1,4-cyclohexanedimethanol and reacted with a methine compound is as follows. A total of 97 g (0.5 mol) dimethyl terephthalate, 23 g (0.16 mol) 1,4-cyclohexanedi-methanol (70% trans isomer, 30% cis isomer), 52.1 g (0.84 m) ethylene glycol, 0.0217 g (200 ppm) of the compound

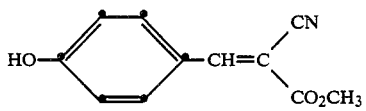

and 0.33 ml of a n-butanol solution of acetyl triisopropyl titanate which contains 0.03 g titanium per ml are weighed into a 500-ml, single-necked, round-bottom flask equipped with a nitrogen inlet, stirrer, vacuum outlet, and condensing flask. The flask and contents are heated at 200° C. for 35 minutes and at 225° C. for 70 minutes with a nitrogen sweep over the reaction mixture while the ester interchange reaction takes place. The metal bath temperature is increased to 270° C. and vacuum, with a stream of nitrogen bleeding into the system, is applied slowly over a 10-minute period until reduced to 100 mm Hg. The flask and contents are heated at 270° C. under a vacuum of 100 mm Hg for 30 minutes, the metal bath temperature is increased to 285° C. and the vacuum reduced slowly over a 10-minute period to 4 to 5 mm Hg. The flask and contents are heated at 285° C. under a vacuum of 4 to 5 mm Hg for 25 minutes, the vacuum is then reduced to 0.3 to 0.5 mm Hg, and polycondensation continued at 285° C. for 22 minutes. The flask is removed from the metal bath and allowed to cool in nitrogen atmosphere. The resulting amorphous polymer is light yellow when compression molded into a film of 15-mil thickness. A UV visible spectrum on amorphous film of the polymer shows a strong absorption at about 350 nm. The resulting polymer has an inherent viscosity of 0.80 measured as above. Gas chromatographic analyses on a hydrolyzed sample of the polyester show that the polyester contains 30 mol % 1,4-cyclohexanedimethanol.

This invention has been described in detail with particular reference to preferred embodiments thereof, but it will be understood that variations and modifications can be effected within the spirit and scope of the invention.

We claim:

1. A polyester composition having a maximum light absorbance within the range of from about 320 nm to about 380 nm and having reacted therein a total of from about 1.0 to about 5,000 parts by weight per million parts by weight of polyester of at least one UV-absorbing compound of the formula

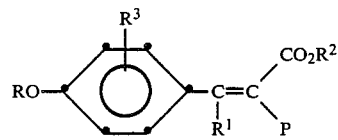

which is nonextractable from the polyester and stable under the polyester processing conditions, wherein:

R is hydrogen, alkyl, substituted alkyl, aryl, substituted aryl, cycloalkyl, substituted cycloalkyl, or alkenyl;

$R^1$ is hydrogen, or alkyl, aryl, or cycloalkyl, all of which may be substituted;

$R^2$ is hydrogen or any radical which does not interfere with condensation with the polyester;

$R^3$ is hydrogen or 1–3 substituents selected from alkyl, substituted alkyl, alkoxy, substituted alkoxy, and halogen; and P is cyano or a group selected from carbamyl, aryl, alkylsulfonyl, arylsulfonyl, heterocyclic, alkanoyl or aroyl, all of which groups may be substituted.

2. A polyester composition of claim 1 having an inherent viscosity of from about 0.4 to about 1.2 determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/-tetrachloroethane solvent wherein:

$R^2$ is hydrogen, alkyl, aralkyl, cycloalkyl, cyanoalkyl, aryl, alkoxyalkyl or hydroxyalkyl;

R is selected from hydrogen; cycloalkyl; cycloalkyl substituted with one or two of alkyl, alkoxy or halogen; phenyl; phenyl substituted with 1-3 of alkyl, alkoxy, halogen, alkanoylamino, or cyano; straight or branched lower alkenyl; straight or branched alkyl and such alkyl substituted with 1-3 of the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamoyl; vinylsulfonyl; acrylamido; sulfamyl; benzoylsulfonicimido; alkylsulfonamido; phenylsulfonamido; alkenylcarbonylamino; groups of the formula

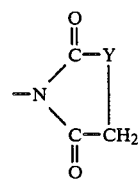

wherein Y is —NH—,

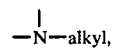

—O—, —S—, or —CH₂O—; —S—R₁₄; SO₂CH₂CH₂SR₁₄; wherein R₁₄ is alkyl, phenyl, phenyl substituted with halogen, alkyl, alkoxy, alkanoylamino, or cyano, pyridyl, pyrimidinyl, benzoxazolyl, benzimidazolyl, benzothiazolyl, or a radical of the formulae

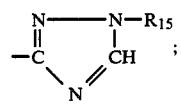

—NHXR₁₆; —CONR₁₅R₁₅; and —SO₂NR₁₅R₁₅; wherein R₁₅ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO₂—; R₁₆ is selected from alkyl and alkyl substituted with halogen, phenoxy, aryl, cyano, cycloalkyl, alkylsulfonyl, alkylthio, and alkoxy; and when X is —CO—, R₁₆ also can be hydrogen, amino, alkenyl, alkylamino, dialkylamino, arylamino, aryl, or furyl; alkoxy; alkoxy substituted with cyano or alkoxy; phenoxy; or phenoxy substituted with 1–3 of alkyl, alkoxy, or halogen; and P is cyano, carbamyl, N-alkylcarbamyl, N-alkyl-N-arylcarbamyl, N,N-dialkylcarbamyl, N,N-alkylarylcarbamyl, N-arylcarbamyl, N-cyclohexylcarbamyl, aryl, 2-benzoxazolyl, 2-benzothiazolyl, 2-benzimidazolyl, 1,3,4-thiadiazol-2-yl, 1,3,4-oxadiazol-2-yl, alkylsulfonyl, arylsulfonyl, alkanoyl or aroyl.

3. A polyester composition of claim 1 wherein R¹ is hydrogen.

4. A polyester composition of claim 1 wherein P is cyano.

5. A polyester composition of claim 1 wherein R¹ is hydrogen and P is cyano.

6. A polyester composition of claim 1 having copolymerized therein the compound of the structure

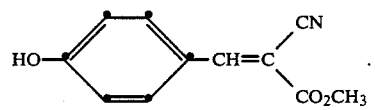

7. A polyester composition of claim 1 wherein the acid moiety is comprised of at least about 50 mol % terephthalic acid residue, and the glycol moiety of at least about 50 mol % ethylene glycol or 1,4-cyclohexanedimethanol residue.

8. A polyester composition of claim 2 having an inherent viscosity of from about 0.65 to about 0.85, wherein the acid moiety is 100 mol % terephthalic acid residue, and the glycol moiety is 100 mol % ethylene glycol residue.

9. A polyester composition of claim 2 having an inherent viscosity of from about 0.65 to about 0.85, wherein the acid moiety is 100 mol % terephthalic acid residue, and the glycol moiety is comprised of from about 65 to about 95 mol % ethylene glycol residue, the remainder being 1,4-cyclohexanedimethanol residue.

10. A formed article of the polyester composition of any of claims 1–9.

* * * * *